United States Patent [19]

Kusmer et al.

[11] Patent Number: 5,388,806
[45] Date of Patent: Feb. 14, 1995

[54] VALVE ASSEMBLY HAVING IMPROVED VALVE SEAT

[75] Inventors: Daniel P. Kusmer, Sugarland; Robert A. Frenzel, Waller, both of Tex.

[73] Assignee: Keystone International Holdings Corp., Houston, Tex.

[21] Appl. No.: 253,337

[22] Filed: Jun. 3, 1994

[51] Int. Cl.⁶ .............................................. F16K 1/22
[52] U.S. Cl. ..................................... 251/306; 251/171
[58] Field of Search ................................ 251/171, 306

[56] References Cited

U.S. PATENT DOCUMENTS

| | | |
|---|---|---|
| 3,642,248 | 2/1972 | Benware . |
| 3,986,699 | 10/1976 | Wucik, Jr. et al. . |
| 4,113,268 | 9/1978 | Simmons et al. . |
| 4,335,748 | 6/1982 | Olansen et al. . |
| 4,375,543 | 2/1983 | Brown ............................ 251/306 X |
| 4,779,841 | 10/1988 | Pupillo et al. . |
| 4,836,500 | 6/1989 | Pupillo et al. ..................... 251/306 |

*Primary Examiner*—John C. Fox
*Attorney, Agent, or Firm*—Browning, Bushman, Anderson & Brookhart

[57] ABSTRACT

A valve comprising a valve body having a first end, a second end, and a through opening forming a fluid flow passage and a wall surrounding a portion of the fluid flow passage, the fluid flow passage defining an axis that is co-axial with the wall. A valve element is rotatably mounted in the valve body, the valve element having an annular, radiused sealing surface and being rotatable around a second axis perpendicular to the first axis passing through the fluid flow passage. A valve seat assembly is disposed in the valve body for sealing engagement with the sealing surface of the valve element, the valve seat assembly being axially displaced from the second axis toward the first end of the valve body, the valve seat assembly comprising a seal ring of a resilient, plastic material and having an annular radially inwardly facing first surface for sealing engagement with the sealing surface on the valve element and an annular, radially, outwardly facing second surface, an annular radially outwardly facing groove being formed in the second surface. An elastomeric backing ring is disposed in the groove, the backing ring being circular in cross-section and having a center-line defined by a first plane passing through the center of the backing ring perpendicular to the first axis, the engagement between the sealing surface on the valve element and the first surface on the seal ring being substantially annular, line contact when the valve element is in the closed position and in the absence of any fluid pressure acting on the valve element, the line contact engagement lying in a second plane axially displace from the first plane in a direction away from the second axis toward the first end of the valve body. There are also provided retaining means for retaining the valve seat assembly in the valve body.

9 Claims, 3 Drawing Sheets

VALVE ASSEMBLY HAVING IMPROVED VALVE SEAT

BACKGROUND OF THE INVENTION

The present invention relates to a valve having a rotatable valve element and, more particularly, to a valve having an improved seat ring assembly.

DESCRIPTION OF THE PRIOR ART

Valves having rotatable valve elements-e.g., butterfly valves--are well known. In certain types of butterfly valves, the valve seat ring that sealingly engages the disk is surrounded by a backing member that is generally elastic in nature and that serves to force or pre-load the seating surface of the seat ring against the disk when the disk is in the closed position. Typical of such a valve seat design is shown in U.S. Pat. No. 3,642,248. In particular, in that patent there is shown a sealing assembly that can be used in a butterfly valve and that comprises a wear ring that would be used to sealingly engage the disk of the valve, the wear ring being provided with an annular, radially outwardly facing groove in which is disposed an elastomeric backing ring that forces or pre-loads the wear ring into sealing engagement with the disk.

In the arrangement shown in U.S. Pat. No. 3,642,248, sealing contact between the periphery of the disk and the wear ring occurs over a large area in what might be characterized as an interference fit, thereby necessitating relatively high torque requirements to seat or unseat the disk.

SUMMARY OF THE INVENTION

It is therefore an object of the present invention to provide a valve having an improved valve seat.

Another object of the present invention is to provide a valve having an improved valve seat assembly comprised of a seal ring and an elastomeric backing ring that pre-loads the seal ring into engagement with the valve disk.

Yet still another object of the present invention is to provide a valve seat for use with a butterfly valve wherein sealing between the disk and the valve seat is accomplished by substantially line contact when there is no fluid pressure acting on the disk, thereby minimizing the amount of torque required to seat or unseat the disk.

The above and other objects of the present invention will become apparent from the drawings, the description given herein, and the appended claims.

The valve of the present invention comprises a valve body having a first end, a second end, and a through opening forming a fluid flow passage, the valve body including a wall surrounding a portion of the fluid flow passage, the fluid flow passage defining a first axis co-axial with the wall. A disk valve element is rotatably mounted in the valve body, the valve element having an annular, radiused sealing surface and being rotatable around a second axis perpendicular to the first axis. A valve seat assembly is disposed in the valve body for sealing engagement with the sealing surface of the disk, the valve seat assembly being axially displaced from the second axis toward the first end of the valve body. The valve seat assembly comprises a seal ring formed of a resilient, plastic material and having an annular, radially inwardly facing first surface that sealingly engages the sealing surface on the disk when the disk is in the closed position. The seal ring has an annular, radially outwardly facing groove formed in a radially outwardly facing second surface. The valve seat assembly further includes an elastomeric backing ring disposed in the groove in the seal ring, the backing ring being circular in cross-section and having a center-line defined by a first plane passing through the center of the backing ring and perpendicular to the first axis. Engagement between the sealing surface on the disk and the first surface on the seal ring is substantially annular line contact when the disk is in the closed position and in the absence of any fluid pressure acting on the disk. The line contact engagement between the disk and the seal ring lies in a second plane axially displaced from the first plane in a direction away from the second axis toward the first end of the valve body. The valve further includes retaining means for retaining the valve seat assembly in the valve body. The valve seat assembly and the retaining means are axially insertable and removable from the valve body through the first end of the valve body.

DESCRIPTION OF THE PREFERRED EMBODIMENT

While the present invention will be described with particular reference to a wafer valve—e.g., a butterfly valve—it is be understood that the valve of the present invention can comprise any quarter-turn valve having a rotatable valve element with a radiused sealing surface such as to permit line contact engagement with the valve seat to effect sealing.

Figure 1:
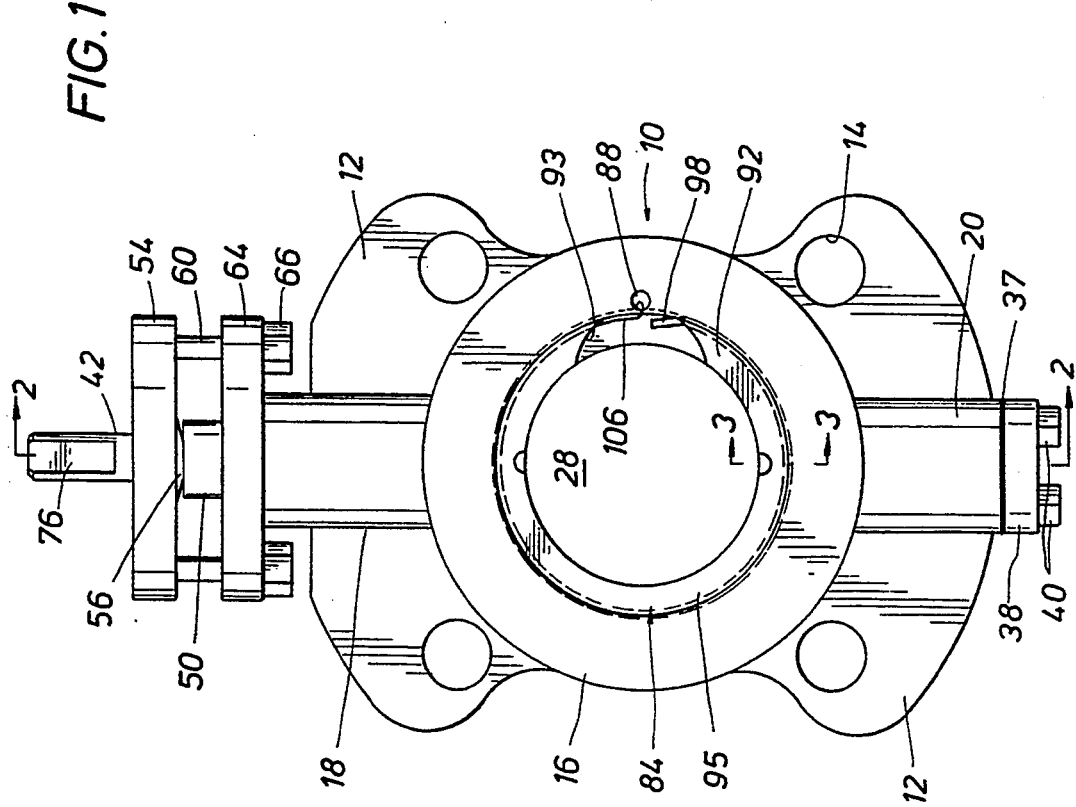
FIG. 1 is a front, elevational view of the valve of the present invention.
Figure 2:
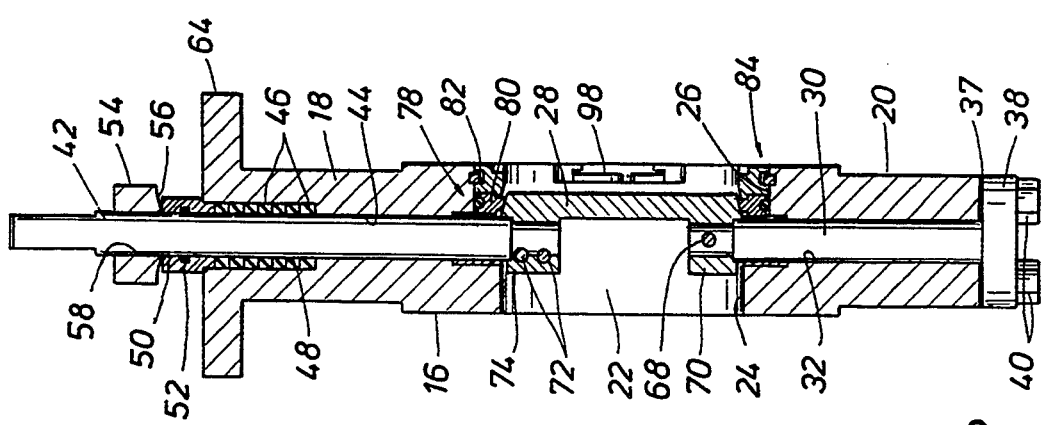
FIG. 2 is a cross-sectional view taken along the lines 2—2 of FIG. 1.

In reference first to FIGS. 1 and 2, the valve of the present invention comprises a valve body 10 optionally provided, as shown, with laterally outwardly projecting ears 12 disposed around the periphery of valve body 10 and having bolt holes 14 for permitting the valve to be connected to adjoining pipe flanges. Valve body 10 comprises a central cylindrical section 16 from which project a neck portion 18 and a bottom boss portion 20, neck portion 18 and boss portion 20 being diagonally disposed relative to one another. Cylindrical section 16 defines a through opening 22 that forms a fluid flow passage through the valve, through opening 22 being formed by co-axial cylindrical walls 24 and 26, cylindrical wall 26, as shown, being of a larger diameter than cylindrical wall 24. Disposed in through opening 22 is a disk-type valve dement 28 having an annular radiused sealing surface 29, valve dement 28 serving to control the flow of fluid through the fluid flow passage defined by through opening 22. A lower shaft 30 extends through a bore 32 in boss 20. Lower shaft 30 is rotatably journalled in bore 32 by means of a bushing 34 received in a counterbore 36 of bore 32. An end cap 38 is secured to boss 20 by bolts 40, a gasket 37 forming a seal.

An upper shaft 42 extends through a bore 44 in neck portion 18. Stacked packing rings 46 received in a counterbore 48 of bore 44 serve to provide a fluid-tight seal between neck portion 18 and upper shaft 42. A packing gland 50 is also received in counterbore 48, packing gland 50 including an O-ring 52 for sealing around upper shaft 42. A gland compression bridge 54 having a central dimple 56 is received on shaft 42 by means of a bore 58 through bridge 54. Bolts 60 extend through registering bores in bridge 54 and flange 64 projecting radially outwardly from neck portion 18. Nuts 66 threadedly received on bolts 60 can be tightened, as will be apparent, to engage dimple 56 with the top of packing gland 50 to compress the stack of packing rings 46 and ensure fluid-tight seal between neck 18 and shaft 42.

Lower shaft 30 is secured to disk 28 by means of a pin 68 received in a first, projecting dog 70 of disk 28. Upper shaft 42 is secured to disk 28 by means of pins 72 extending through a second, projecting dog 74 of disk 28 in a manner well known to those skilled in the art. Accordingly, disk 28 is rotatably journalled in throughway 22 of valve body 10 and can be rotated 90° manually or by means of an actuator to control fluid flow through the valve. To this end, upper shaft 42 is provided with wrench flats 76.

To effect sealing around the periphery of disk 28, there is provided an annular valve seat assembly, shown generally as 78 and described more fully hereafter. Valve seat assembly 78 is held in valve body 10 by means of a valve seat retainer assembly shown generally as 84 and described more fully in co-pending application Ser. No. 08/253,963, filed contemporaneously herewith, entitled "Valve Assembly," and naming Daniel F. Kusmer and Robert A. Frenzel as inventors (Kusmer application), said Kusmer application being incorporated herein for all purposes.

Figure 4:
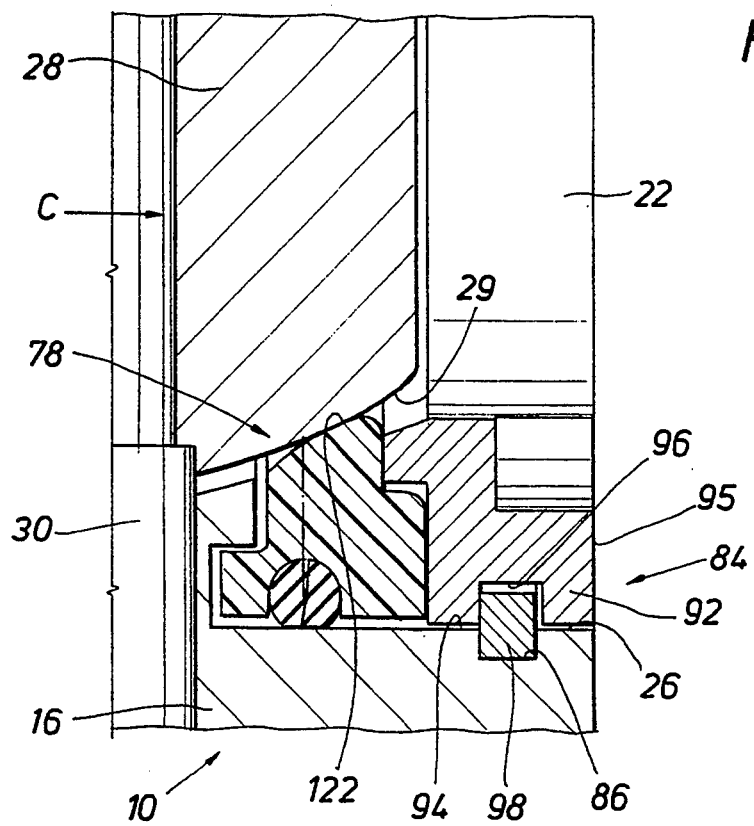
FIG. 4 is a view similar to FIG. 3 with the exception that the disk is subjected to fluid pressure in the direction shown by the arrow.
Figure 3:
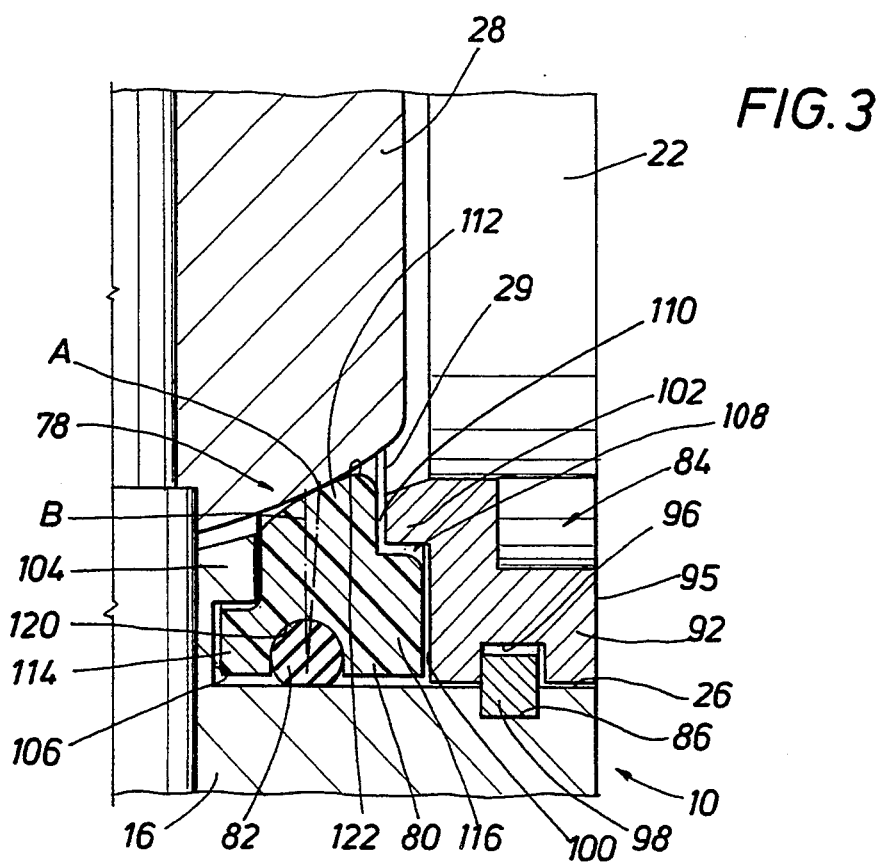
FIG. 3 is an enlarged, fragmentary view, partially in section, showing the relationship between the valve seat and the disk with the disk in the closed position and no fluid pressure acting on the disk.
Figure 5:
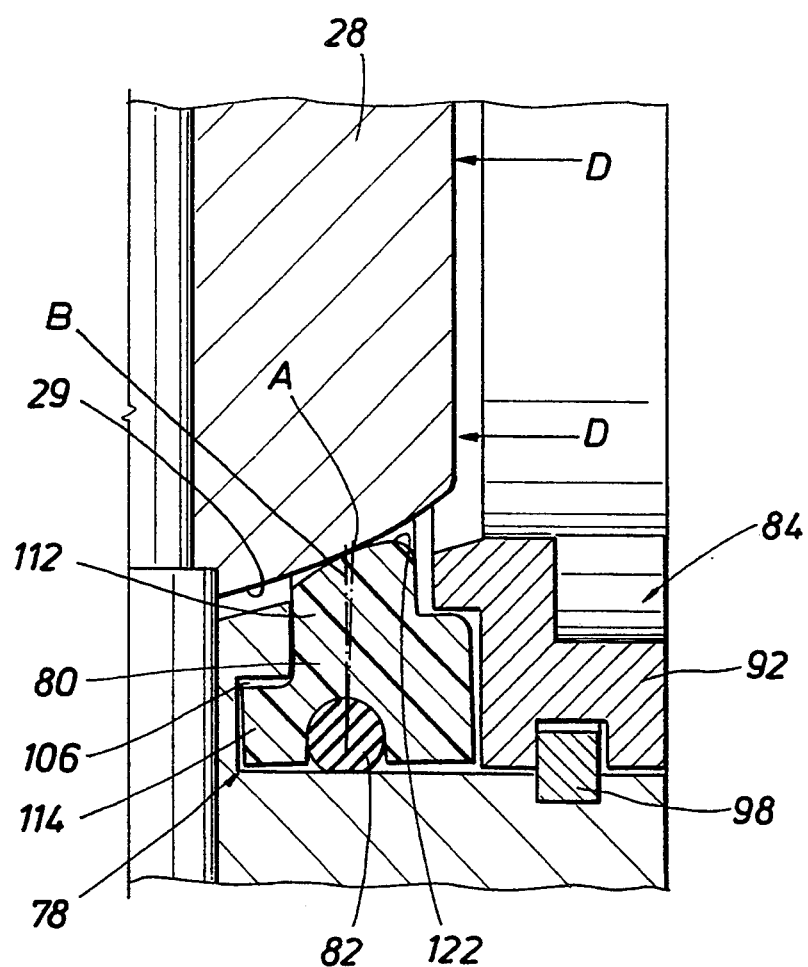
FIG. 5 is a view similar to FIG. 3 with the exception that the disk is subjected to fluid pressure in a direction opposite from that shown in FIG. 4.

With reference to FIGS. 3-5, it can be seen that wall 26 defines an annular, radially inwardly facing surface having an annularly extending, radially inwardly facing groove 86. Groove 86 is intersected by a bore 88 (see FIG. 1) drilled axially in valve body 10, the intersection of bore 88 and groove 86 forming an aperture in the bottom of groove 86. Retainer assembly 84 includes a retainer ring 92 that has a peripheral surface 94 that is shaped and sized such that peripheral surface 94 closely faces the radially inwardly facing surface defined by wall 26 when ring 92 is received in the valve body 10. Ring 92 also has an annularly extending, radially outwardly facing groove 96 that, when ring 92 is received in valve body 10, is in register with groove 86, grooves 86 and 96 thereby defining an annularly extending channel. Ring 92 has a first side 95 provided with a notch 93 that intersects groove 96 in a manner more fully described in the Kusmer application, and wire member 98 is received in the annular channel formed by grooves 86 and 96 and effectively prevents any axial movement of ring 92 in valve body 10. Wire member 98 has a first end 106 that has a leg portion extending generally transverse, preferably at 90°, to the long axis of wire member 98. To install ring 92 in valve body 10, ring 92 is placed in valve body 10 such that notch 93 is in register with the aperture formed in the bottom of groove 86. The leg portion of the end 106 of wire member 98 is then accessed through the notch 93 and disposed in the pocket in groove 86. This effectively fixes the first end 106 of wire member 98 in annular groove 86. Ring 92 can then be rotated counterclockwise (with reference to FIG. 1)—i.e., in a direction along the length of wire member 98 away from first end 106. This will result in threading wire member 98 into the channel formed by grooves 86 and 96. At such point when ring 92 has been rotated to where notch 95 is again in register with the pocket in groove 86, wire member 98 will be completely disposed in the channel formed by registering grooves 86 and 96. Accordingly, a retainer ring 92 will be effectively trapped in valve body 10 and prevented from any axial movement, thereby ensuring that valve seat assembly 78 cannot be dislodged by line pressure.

Retainer ring 92 has a second side 100 provided with an annularly extending, axially projecting flange 102. Valve body 10 includes an axially facing, annularly extending flange 104, flanges 102 and 104 facing each other. There is thus defined a first, annular, axially facing recess 106 partially defined by flange 104 and a second, annular, axially facing recess 108 partially defined by flange 102. As seen, recess 106 has a radial width less than recess 108, recesses 106 and 108 facing each other. Flanges 102 and 104 also partially define an annularly extending channel 110 that intersects recesses 106 and 108 and opens into flow passage 22. Effectively, recesses 106 and 108 and channel 110 form a generally T-shaped, annular valve seat cavity.

With reference particularly to FIG. 3, the valve is shown with the disk 28 in the closed position—i.e., surface 29 sealingly engaging annular seating surface 122 on seal ring 80. Seal ring 80 includes a central, annularly extending body portion 112 that is received in channel 110, a first, annular flange portion 114 integral with body portion 112 and received in recess 106 and a second, annular flange portion 116 integral with body portion 112 and received into recess 108. As can be seen, central body portion 112, flange portion 114, and flange portion 116 are sized and shaped so as to closely fit in the valve seat cavity formed by channel 110, recess 106, and recess 108, respectively.

In the embodiment shown in FIG. 3—i.e., when the disk 28 is in the closed position sealingly engaging seal ring 80 and no pressure acting upon disk 28, sealing contact between disk 28 and seal ring 80 occurs in substantially annular line contact, the line contact being indicated by the letter "A" in FIG. 3. With reference to FIG. 3, it can be seen that the center-line of elastomeric backing ring 82, indicated by dotted line B, is displaced axially from line A toward the axis of rotation of disk 28. In point of fact, the center-line of elastomeric backing ring 82 lies in a plane that is perpendicular to an axis passing through fluid flow passage 22—i.e., substantially parallel to the axis of rotation of disk 28. Further, it can be seen that seal ring 80 has an annularly extending, radially outwardly facing groove 120 that is complementarily shaped to backing ring 82 such that backing ring 82 snugly fits in groove 120. The center-line of groove 120 also lies on the plane passing through the center-line of backing ring 82. It will thus be apparent that backing ring 82 is asymmetrically positioned with respect to a center-line passing through body portion 112 of seal ring 80—i.e., both groove 120 and backing ring 82 are displaced axially toward the axis of rotation of disk 28. This geometry provides unique benefits explained more fully hereafter.

Reference is now made to FIG. 4 to show the interaction of the disk 28 and the seat assembly 78 upon the application of pressure against disk 28 in a direction as shown by arrow C. In the position shown in FIG. 4 with disk 28 in the closed position, pressure acting in the direction of arrow C will deflect disk 28 in the direction of arrow C—i.e., peripheral sealing surface 29 will be urged into interference, relatively large area surface contact with the annular seating surface 122 formed on seal ring 80. Additionally, the fluid pressure will enter the valve seat cavity and exert a force against seal ring 80, moving flange 116 into abutment with the second face 100 of retaining ring 92 and body portion 112 into abutment with flange 102.

With reference now to FIG. 5, the interaction of the disk 28 and the valve seat assembly 78 is shown in connection with fluid pressure acting on disk 28 in the direction of arrows D—i.e., in a direction toward the axis of rotation of disk 28. In this condition, again with disk 28 in the closed position, disk 28 will be deflected toward the axis of rotation of disk 28—i.e., in the direction of arrows D. At the same time, the fluid pressure will enter the valve cavity and will force seal ring 80 to rotate around backing ring 82 with the net result that while line contact between surface 29 and surface 122 will still be in effect, the annular line contact will be moved axially such that a plane passing through the line contact, indicated by A, and perpendicular to an axis passing through flow way 22—i.e., parallel to the axis of rotation of disk 28—will now lie closely adjacent to the plane passing through the center-line (indicated by B) of backing ring 82. It will also be seen that the rotation of the seal ring 80 around backing ring 82 will cock or tilt seal ring 80, as shown, such that body portion 112 will be in engagement with flange 104. However, because of this rotational, or rocking motion, of seal ring 80 around backing ring 82, flange portion 114 will only slightly, if at all, engage the back of the recess 106. Thus, line contact will be maintained under the conditions shown in FIG. 5, with effective sealing of fluid pressure; and however, because of such line contact, the amount of torque required to seat and unseat disk 28 is kept at a minimum. While surface 122 of seal ring 80 is shown as being radiused, it will be appreciated that line contact could still be achieved if surface 122 were frustoconical since surface 29 on disk 28 is radiused. It is also to be observed that at all times, backing ring 82, which is a relatively elastomeric material, maintains an effective seal between seal ring 80 and valve body 10.

As noted above, seal ring 80 is made of a resilient, plastic material such as, for example, certain rubbers, Teflon ®, nylon, etc. Backing ring 82 will generally be made of an elastomeric material that is softer than the material of seal ring 80, such materials including certain rubbers and other well-known elastomeric materials used in forming O-rings and the like.

Obviously, numerous modifications and variations of the present invention are possible in light of the above teachings. It is therefore to be understood that within the scope of the appended claims, the invention may be practiced otherwise than as specifically described herein.

What is claimed is:

1. A valve comprising:
   a valve body having a first end, a second end, and a through opening forming a fluid flow passage, said valve body including a wall surrounding a portion of said fluid flow passage, said fluid flow passage defining an axis co-axial with said wall;
   a valve element rotatably mounted in said valve body, said valve element having an annular, radiused sealing surface and being rotatable around a second axis perpendicular to said first axis;
   a valve seat assembly disposed in said valve body for sealing engagement with said sealing surface of said valve element, said valve seat assembly being axially displaced from said second axis toward said first end, said valve seat assembly comprising:
   a seal ring formed of a resilient, plastic material and having an annular, radially inwardly facing first surface for sealing engagement with said sealing surface on said valve element and an annular, radially outwardly facing second surface, an annular, radially outwardly facing groove being formed in said second surface,
   an elastomeric backing ring disposed in said groove, said backing ring being circular in cross-section, said backing ring having a center-line defined by a first plane passing through the center of said backing ring perpendicular to said first axis, the engagement between said sealing surface on said valve element and said first surface on said seal ring being substantially annular, line contact when said valve element is in the closed position and in the absence of any fluid pressure acting on said valve element, said line contact engagement lying in a second plane axially displaced from said first plane in a direction away from said second axis toward said first end of said valve body; and
   retaining means for retaining said valve seat assembly in said valve body.

2. The valve of claim 1 wherein said annular, radially outwardly facing groove has a cross-sectional configuration that is complementary to the cross-sectional configuration of said backing ring.

3. The valve of claim 1 wherein said valve body and said retaining means cooperate to define an annularly extending valve seat cavity for receiving said valve seat assembly.

4. The valve of claim 3 wherein said valve seat cavity, when viewed in transverse cross-section, has a first annular, axially facing recess, said first recess facing toward said first end of said valve body, and a second axially facing recess, said second recess facing said first recess, and said valve cavity further including an annularly extending channel intersecting said first and second recesses and opening into said flow passage.

5. The valve of claim 4 wherein said first recess has a radial width less than the radial width of said second recess.

6. The valve of claim 5 wherein said seal ring includes a central body portion received in said channel, a first flange portion integral with said body portion and extending into said first recess and a second flange portion integral with said body portion extending into said second recess, said body portion and said first and second flanges cooperating to define said second surface.

7. The valve of claim 5 wherein said central body portion, said first flange portion, and said second flange portion are sized and shaped so as to closely fit in said channel, said first recess, and said second recess, respectively.

8. The valve of claim 7 wherein said outwardly facing groove in said second surface has a center-line lying on said first plane and said first plane axially displaced toward said first axis from a center-line of said body portion lying in a third plane parallel to said first and second planes.

9. The valve of claim 1 wherein said first surface on said seal ring is radiused.

* * * * *

UNITED STATES PATENT AND TRADEMARK OFFICE
CERTIFICATE OF CORRECTION

PATENT NO. : 5,388,806
DATED : February 14, 1995
INVENTOR(S) : Daniel P. Kusmer and Robert A. Frenzel It is certified that error appears in the above-indentified patent and that said Letters Patent is hereby corrected as shown below:

In column 6, line 5, delete "seal" and insert therefor --seat--.

In column 6, line 20, after "being" insert --in--.

Signed and Sealed this

Thirtieth Day of May, 1995

Attest:

BRUCE LEHMAN

Attesting Officer        Commissioner of Patents and Trademarks